US011110341B2

(12) United States Patent
Knippen

(10) Patent No.: US 11,110,341 B2
(45) Date of Patent: Sep. 7, 2021

(54) MULTI-PURPOSE BOARD GAME EMPLOYING A GAME BOARD AND GAME PIECES WITH WIRELESS TECHNOLOGY TO COMMUNICATE TO THE INTERNET

(71) Applicant: Zwiffer Inc., Manhattan, IL (US)

(72) Inventor: Matthew Knippen, Manhattan, IL (US)

( * ) Notice: Subject to any disclaimer, the term of this patent is extended or adjusted under 35 U.S.C. 154(b) by 0 days.

(21) Appl. No.: 15/389,419

(22) Filed: Dec. 22, 2016

(65) Prior Publication Data

US 2018/0178113 A1      Jun. 28, 2018

(51) Int. Cl.
| | |
|---|---|
| *A63F 3/00* | (2006.01) |
| *A63F 13/214* | (2014.01) |
| *A63F 13/92* | (2014.01) |
| *A63F 3/02* | (2006.01) |
| *G09B 19/22* | (2006.01) |
| *A63F 9/24* | (2006.01) |
| *A63F 13/218* | (2014.01) |

(52) U.S. Cl.
CPC ............ *A63F 3/00643* (2013.01); *A63F 3/02* (2013.01); *A63F 3/022* (2013.01); *A63F 13/214* (2014.09); *A63F 13/92* (2014.09); *G09B 19/22* (2013.01); *A63F 13/218* (2014.09); *A63F 2003/00662* (2013.01); *A63F 2003/00665* (2013.01); *A63F 2003/00668* (2013.01); *A63F 2003/00671* (2013.01); *A63F 2009/2452* (2013.01); *A63F 2009/2454* (2013.01); *A63F 2009/2485* (2013.01); *A63F 2009/2486* (2013.01)

(58) Field of Classification Search
CPC .... A63F 3/00643; A63F 3/00694; A63F 3/02; A63F 3/022; A63F 13/281; A63F 13/822; A63F 2003/00662; A63F 2003/00668; A63F 2003/00671; A63F 2300/6045; G09B 19/22

See application file for complete search history.

(56) References Cited

U.S. PATENT DOCUMENTS

| | | | | |
|---|---|---|---|---|
| 4,492,581 | A * | 1/1985 | Arai ....................... | G09B 19/22 273/238 |
| 4,541,633 | A * | 9/1985 | Newbill .............. | A63F 3/00643 273/238 |
| 2010/0013153 | A1 * | 1/2010 | Yourlo ....................... | B41J 3/28 273/237 |

(Continued)

FOREIGN PATENT DOCUMENTS

| | | | | |
|---|---|---|---|---|
| JP | H0354680 | U | * | 5/1991 |
| JP | 08103534 | A | * | 4/1996 |
| JP | 2004081768 | A | * | 3/2004 |

*Primary Examiner* — Werner G Garner
(74) *Attorney, Agent, or Firm* — Steptoe & Johnson LLP

(57) ABSTRACT

An electronic game board wherein the board comprises a plurality of sensors and indicators such that two or more players may play the same game with each other using two or more different game boards that may communicate with each other either directly or through a server. The game board comprises a memory, antenna, and microprocessor associated with the sensors and indicators so that the game board may determine, store, and display a game state based-in-part on data obtained from the game board itself and either another game board or an artificially intelligent player operating in response the present game board.

8 Claims, 6 Drawing Sheets

(56) References Cited

U.S. PATENT DOCUMENTS

| | | | | |
|---|---|---|---|---|
| 2010/0331083 A1* | 12/2010 | Maharbiz | ............ | A63F 3/00214 |
| | | | | 463/30 |
| 2012/0052934 A1* | 3/2012 | Maharbiz | ............ | A63F 3/00214 |
| | | | | 463/9 |
| 2014/0066152 A1* | 3/2014 | Uhren | ................ | G07F 17/3244 |
| | | | | 463/11 |
| 2016/0101357 A1* | 4/2016 | Miller | ................ | G07F 17/3234 |
| | | | | 463/42 |
| 2017/0296894 A1* | 10/2017 | Min | ...................... | A63G 31/02 |

* cited by examiner

MULTI-PURPOSE BOARD GAME EMPLOYING A GAME BOARD AND GAME PIECES WITH WIRELESS TECHNOLOGY TO COMMUNICATE TO THE INTERNET

BACKGROUND OF THE INVENTION

While board games have been around for thousands of years, they have all been played in two different ways. The first is the way a standard board game has been played, defined by the definition above, with standard pieces and a board on a table. The second common technique is to play them on a digital screen, such as on a phone, tablet, PDA, television or computer.

Currently, there is no way to play a game on a physical board with a player that is in a different location without playing on a digital screen. The present invention solves this issue by networking physically-separated game boards while allowing players to remotely interact with one another using a physical game board.

SUMMARY OF THE INVENTION

In one aspect, a physical game board can have wireless capabilities such as Bluetooth, Wi-Fi or Near Field Communication (NFC) built inside of the game board allowing it to communicate to the internet, either directly, or indirectly through another device such as a mobile phone, tablet, smartwatch or computer. The device can also have an option to communicate to another device directly, such as a mobile phone, tablet, or computer, to allow for a single player experience.

In certain circumstances, the game board is able to communicate with a computer game server to allow two or more people to play a physical board game together anywhere in the world, allowing users to play on a board game, on a simulated board game on a different type of device or allow a person to play against a super-computer over a network connection.

The device can make use of a power source, such as a power connection to a AC wall outlet, a battery, or solar panels.

The game board can monitor the state of play through a variety of sensors, such as a magnetic field sensor, pressure sensor, light sensor, or a sensor to monitor flexibility. This current status can be sent over the internet or to another device to monitor the game's state, and to either update the other player's status of the game, insure that a proper move has been made, allow the device to provide a response to the player's action.

The game board can receive feedback wirelessly from another device, to show the status of another player's status of the game, state that the player has made an illegal move according to the rules of the game, or otherwise direct the player as to what they should do next. Feedback can be provided to the player by an audible alert or noise, Light Emitting Diode's or LED's, a graphical screen or display, a vibration, or any other feedback that would indicate to the player that something has happened to the game.

If an intermediary device is used, that device can also have a way to provide input or feedback to both the player, the game board, or the server. The intermediary device is preferably a game server, mobile device, video game console, or personal computer. Most preferably the intermediary device can be the game server. The intermediate device, and/or the game server can be used for choosing who to play against, keeping track of statistics, suggesting a next move, showing the last moves of the game, recording the game history, a chat mechanism between the players (via electronic text messages, audio, or video), or send/receive any type of status or information in relation to the game or its players.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale, show relative dimensions.

DESCRIPTION OF THE ILLUSTRATIVE EMBODIMENTS

Figure 1:
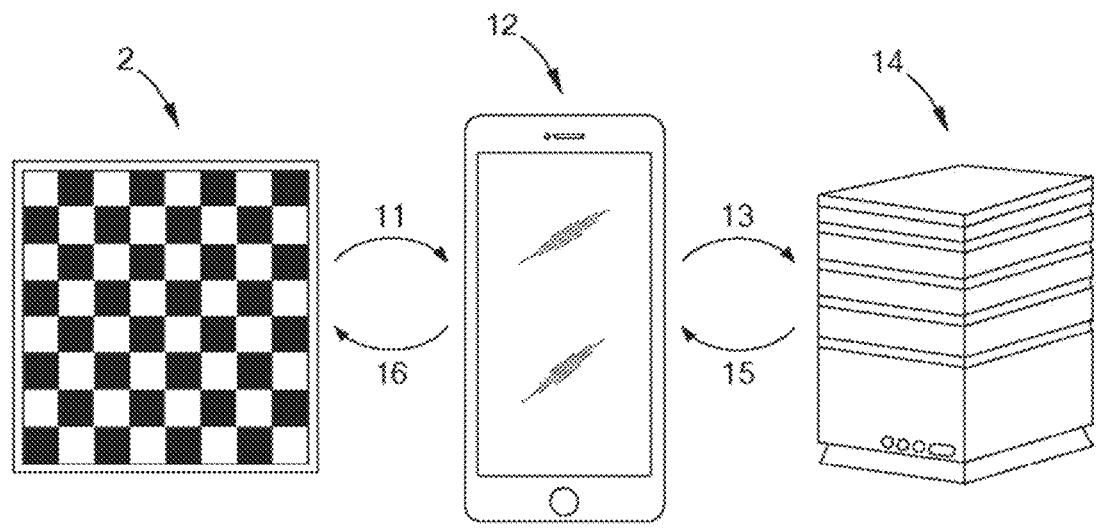
FIG. 1 is a schematic depiction of the model depicted in the present invention in which a game board communicates with an electronic device which in turn communicates to a game server.

FIG. 1 presents an embodiment wherein of a game board 2 communicating with a device such as a mobile phone, tablet, smartwatch or computer 12, utilizing a downlink connection 11 (e.g. over Wi-Fi, Bluetooth, or Near Field Communication). After a player makes a move on the game board 2, the state of play can then be sent to the device 12 utilizing one of the above wireless technologies. The device can then, optionally, communicate to a game server 14, through an uplink connection 13 (e.g. the Internet over a standard web protocol), allowing the game server to determine the state of play at the player's game board 2, and send it to another player. Once the game server has calculated or received the next state of play, it can return it to the device over a downlink connection 15 that may be the protocol as uplink connection 13. The device 12, can then update the wireless game board 2, over a uplink connection 16 that may be the protocol as uplink connection 11. If another user is playing the game, the result of the data sent via uplink connection 13 can trigger the downlink connection 15 back to the other player's device, similar to device 12. The other player's device would then send the game state back to the player's game board 2, via uplink connection 16. An alternative option is for the device to determine the next state of play on its own, allowing device 12 to work with the game board 2 by itself, eliminating the need for the game server 14 and corresponding uplink 13 and downlink 14. A third option would be for the processor within the game board 2 to determine its own state of play.

Figure 2:
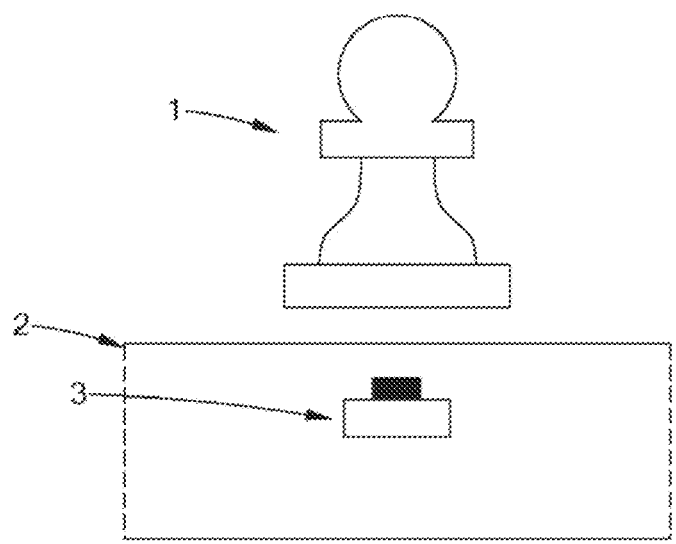
FIG. 2 is a perspective view of a pressure sensor detecting a game piece in a particular spot on the board.

FIG. 2 presents an embodiment wherein a game piece 1 made of wood, metal, or glass as it is being placed onto a physical game board 2 made of a material such as wood, cardboard, or a metal. The game piece 1 has a physical mass (weight) that can be measured by a sensor. Game piece 1 may be one of many types of game pieces (e.g. a knight or a queen in chess); some game pieces have approximately the same weight (e.g. pawns, or the king and queen) A pressure sensor 3 inside of the game board 2 detects the change in weight when the game piece 1 is placed on top of the sensor, allowing the sensor to detect when a particular piece is placed on top of the sensor. Specifically, based on the weight of the game piece 1, the sensor can detect what type of piece was placed into the location. Alternatively, a flexible sensor can be utilized to detect changes in the top surface of the game board.

Figure 3:
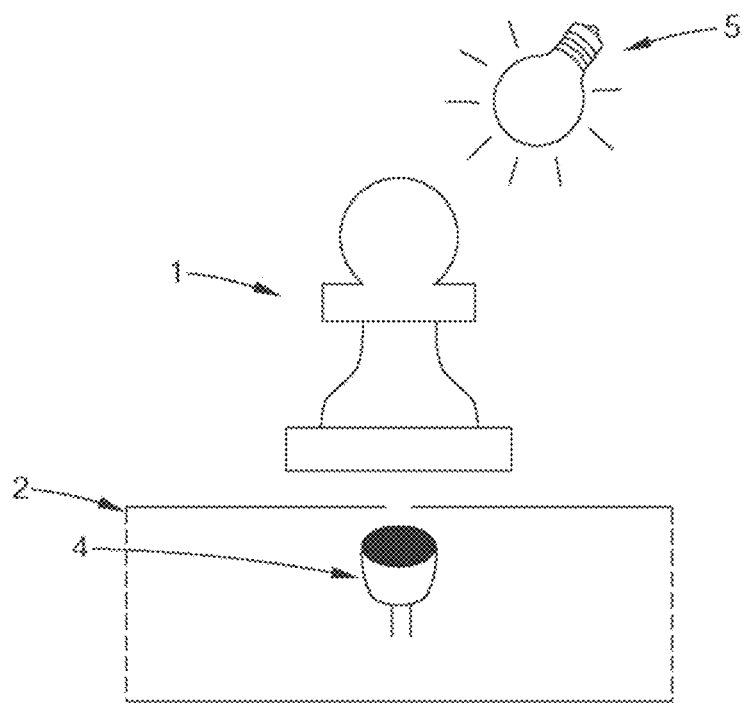
FIG. 3 is a perspective view of a light sensor (photo resistor) and an LED to detect a game piece in a particular spot on the board.

FIG. 3 presents an embodiment wherein a designated location on game board 2 contains a photoresistor (light sensor) 4, which detects the ambient light 5 in the room that the game is being played. The absence of ambient light can indicate that a game piece 1 is on top of the photoresistor 4. A microcontroller can take initial readings of the ambient light 5 measured by the photoresistor 4, and compare with subsequent readings of the ambient light 5 measured by the photo-resistor after a piece is placed on top of the photoresistor 4. By comparing the initial readings with the various subsequent readings, the microcontroller can determine the difference between game piece 1 being placed on the board, and a shadow over the game board. Since the sensor is not able not detect what type of game piece 1 is placed on top of the photoresistor 4, but the microcontroller may be able to determine which game piece 1 was placed based on a new open spot on the board.

Figure 4:
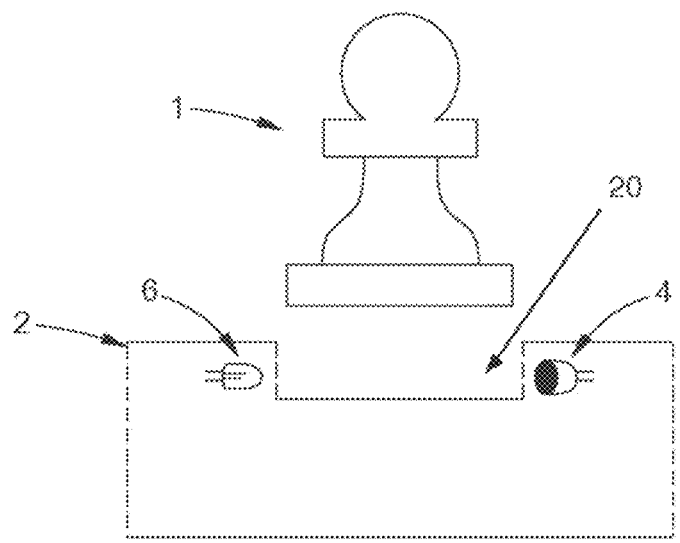
FIG. 4 is a perspective view of a light sensor (photo resistor) and ambient light in a room to detect a game piece in a particular spot on the board.

FIG. 4 presents an embodiment wherein a game piece 1 fits in a carved-out portion of game board 2. The game board includes a recess 20 where game piece 1 may be placed. A photoresistor (light sensor) 4 can be placed on one side of the recess (depicted in FIG. 4 on the left of the recess). Photoresistor 4 detects the presence of light emanating from LED 6, placed on the opposite side of the recess (depicted in FIG. 4 on the right of the recess). After game piece 1 is inserted into the recess 20 in the game board 2, the light from LED 6 is blocked. This operates in a similar manner to a garage door sensor, which can detect if a person is walking through the door when it is closing. In another embodiment, where the board game requires detection of different pieces, the bottom of game piece 2 could be made of a semi-transparent material, allowing the photoresistor to sense a varying amount of light based on the transparency of the material. Using this method, each unique game piece 1 can have a different transparency, allowing the sensor's input to determine exactly what piece is placed in recess 20. Using this method over the method in FIG. 3 can reduce or eliminate the complications from shadows, and can allow for the detection of different game pieces.

Figure 5:
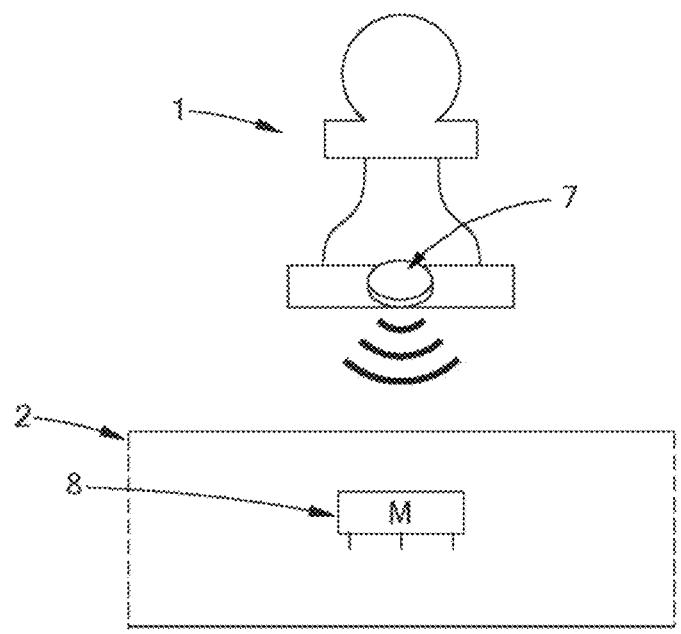
FIG. 5 is a perspective view of a magnetic sensor and magnet inside of a game piece to detect a game piece in a particular spot on the board using magnetic force.

FIG. 5 is an illustration of a game piece 1 containing a magnet 7. The game board 2 contains a magnetic sensor 8, which can detect a change in magnetic force (e.g. when the game piece containing the magnet 7 is placed on top of the sensor versus when there is no game piece present). Specifically, magnetic sensor 8 can detect game piece 1 if it is placed directly above the sensor on the board. Magnets of varying strengths can be used, allowing the magnetic sensor 8 to detect the difference between unique game pieces.

Figure 6:
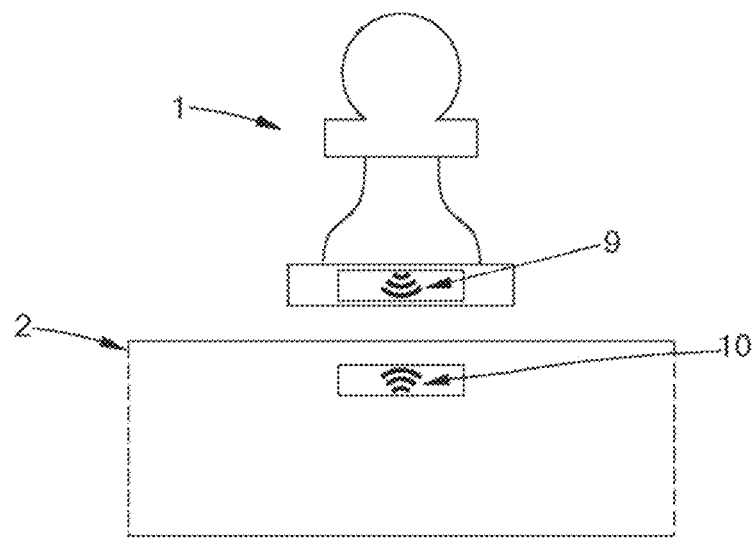
FIG. 6 is a perspective view of a Near Field Communication (NFC) tag inside of a game piece and a NFC sensor inside of a game board, allowing the detection of a game piece on a game board.

FIG. 6 is an embodiment of the present invention wherein game piece 1 contains a Near-Field-Communication (NFC) tag 9. The NFC tag 9 preferably contains data about game piece 1 that can read from an NFC reader 10. The game board 2 can include an NFC reader 10, which can read the information stored inside the NFC tag 9. Using various NFC tags would allow for a plethora of different game pieces. In another embodiment, the NFC reader may also have write capabilities, allowing portions of the game state to be saved inside of the game piece.

Figure 7A:
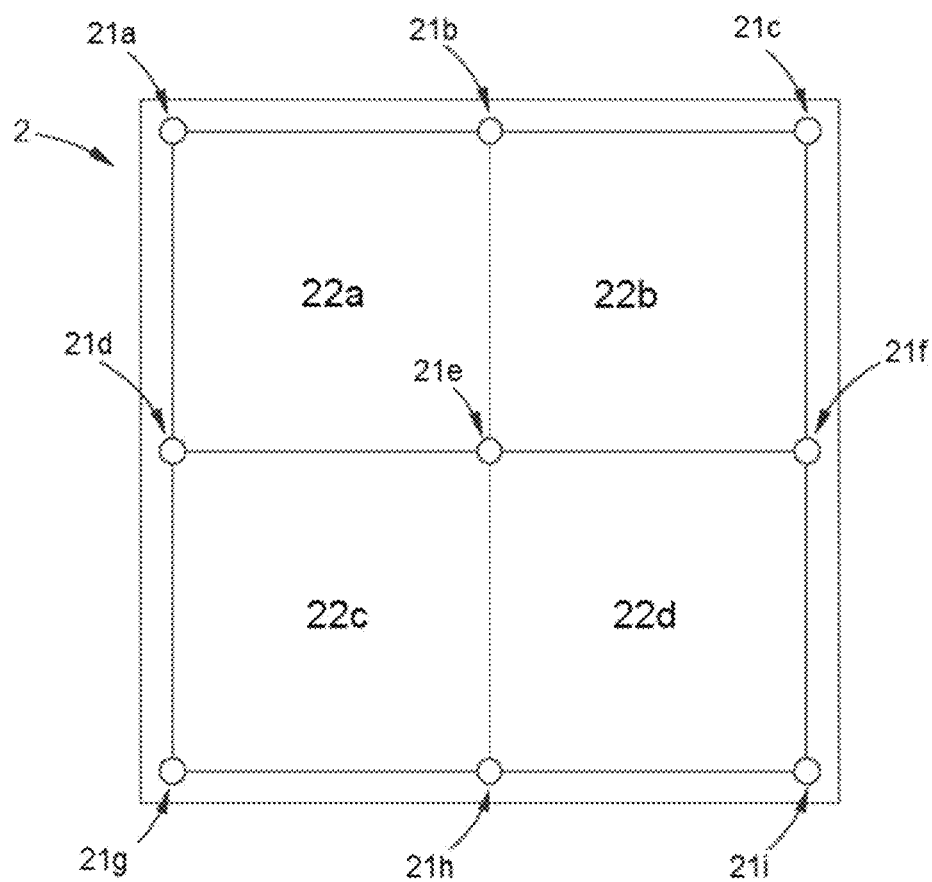
FIGS. 7A and 7B are a diagram of Light Emitting Diodes (LEDs) arranged in a way that would allow a user to interpret the next board state based on which LEDs are illuminated.

FIG. 7A is an illustration of an embodiment of the present invention with indicators 21*a-i*, preferably Light Emitting Diodes (LEDs), indicating which positions 22*a-d* a game piece may be placed based on the current game state. Indicators 21*a-i* may also be used to visually represent the location of a piece. In this embodiment, the indicators are arranged on the corners around a square to identify a position. In other embodiments, the indicators can be located in other configurations in or around a position. In the embodiment shown in FIG. 7A, to indicate position 22*a* as available, indicators 21*a*, 21*b*, 21*d* & 21*e* can illuminate, creating a square around the position. To indicate position 22*c* as available, indicators 21*d*, 21*e*, 21*g* & 21*h* can illuminate. Thus, some of the same indicators are reused where a location shares an edge with another location. The indicators can also inform the player where an opponent has moved on the opponent's game board. In instances where a single player controls multiple types of game pieces, different colors may correspond to each type of game piece. For example, a pawn, rook, knight, bishop, queen, and king may correspond to red, orange, yellow, green, blue, and violet, respectively. In an alternative embodiment, an audio speaker may be configured for use with the game board to aurally announce where each piece can be placed.

Figure 7B:
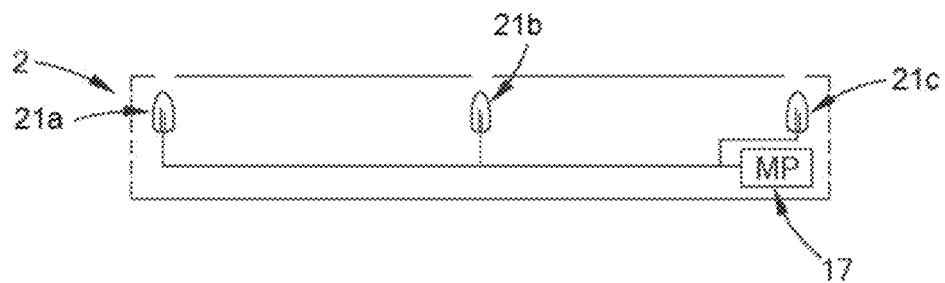

FIG. 7B presents a cross-section of the game board 3 shown in FIG. 7A. It shows a simplified diagram showing that all of the indicators 21*a-c* will be connected to a microprocessor 17, allowing positions on the board to be illuminated based on the current game state as described above.

Figure 8A:
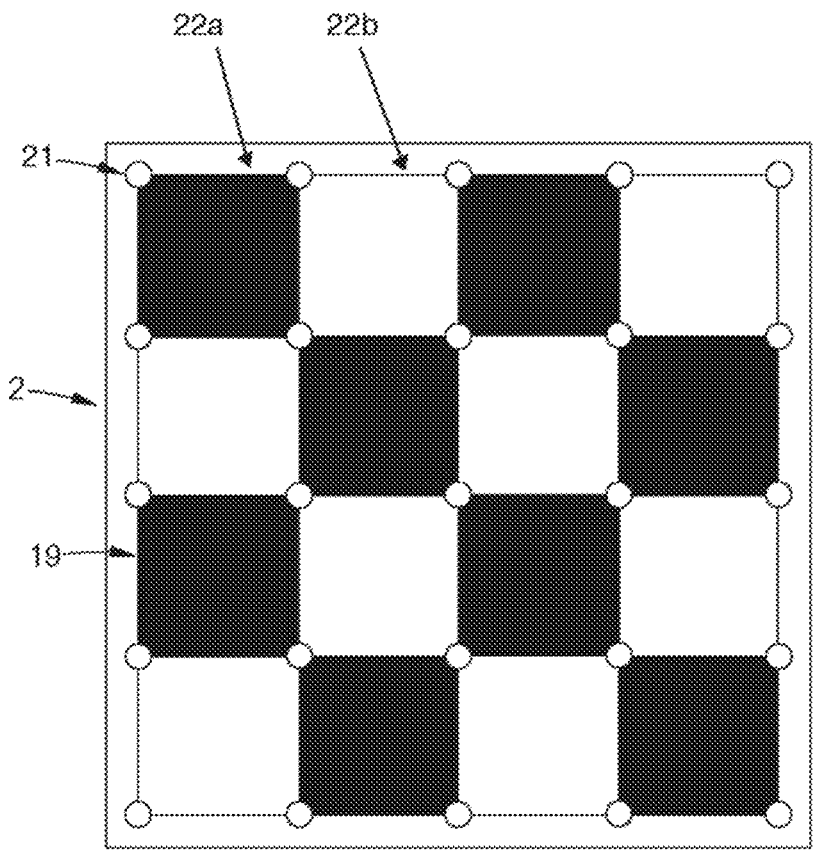
FIGS. 8A and 8B are a diagram combining the elements of FIG. 7 as well as the elements of a sensor (FIG. 2-FIG. 6) showing how the sensors and LED's could be combined to determine and update the game board's state of play.

FIG. 8A presents a top-down view of an embodiment wherein a game board 2 includes a plurality of locations for pieces to be placed. In one embodiment shown in FIG. 8A, the locations are shown as black 22*a* and white 22*b* squares. Each space on the board includes a sensor 19. The sensors can determine which pieces are present at a location to determine the current game state. An indicator 21, or plurality of indicators, can then represent the game state to a user. A user may then manually move the game pieces (not shown). Preferably, the indicator 21 is an LED, but other indicators may be used to visually represent the location of a piece. In instances where a single player controls multiple types of game pieces, different colors may correspond to each type of game piece. For example, a pawn, rook, knight, bishop, queen, and king may correspond to red, orange, yellow, green, blue, and violet, respectively. In an alternative embodiment, an audio speaker may be configured for use with the game board to aurally announce where each piece can be placed. The use of an indicator allows for game board 2 to indicate the moves made by either an artificial intelligence (AI) player or another player using a separate game board (not shown.) The player using game board 2 may then place the opponents' pieces on the proper locations on game board 2. In an embodiment, a microprocessor and memory (not shown) may store a player's moves on game board 2 when the board is not in communication with another game board or the server. In an embodiment, the game board 2 includes an antenna for wireless communications, and in certain embodiments may be built into the microprocessor or the edge of the game board. In instances where the antenna is not in communication with another game board or the game server, the board's memory will store the game's state and communicate it to the other game board or server once the antenna is back in communication with either the corresponding game board or server.

Figure 8B:
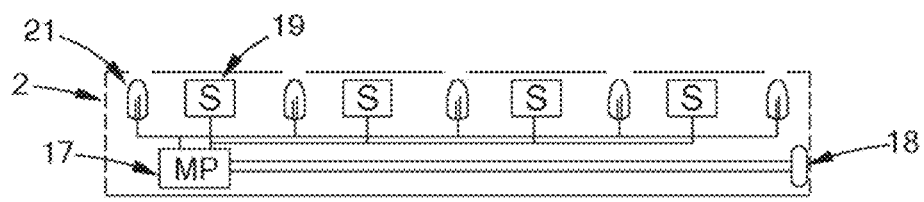

FIG. 8B presents a cross-section of the game board 2 shown in FIG. 8A. Here, each spot 22*a*, 22*b* is associated with a sensor 19, a microprocessor 17, and an indicator 21. The sensors 19 could be any of the sensors shown in FIG. 2-FIG. 6 and described above, or any sensor that is capable of sensing that a piece is on the game board 2. The microprocessor 17 may also contain an antenna (not pictured), which is capable of transmitting data to a server or another game board. Microprocessor 17 is configured to detect inputs from sensors 19 and transmit that information through antenna to a server or another game board (not shown). The antenna is preferably a Wi-Fi, NFC, Bluetooth, or cellular antenna. The antenna can be configured to communicate either with a server (not shown) or another game board (not shown). Microprocessor 17 may also receive information regarding another game board (not shown) via the antenna. The microprocessor communicates with the proper indicators 21 to represent the game state. The game board also features a power source 18, which may be, for example, an AC outlet in the wall, or a battery. In other embodiments, microprocessor can independently calculate a game state based on the moves of an AI player in response to the use of game board 2.

Figure 9:
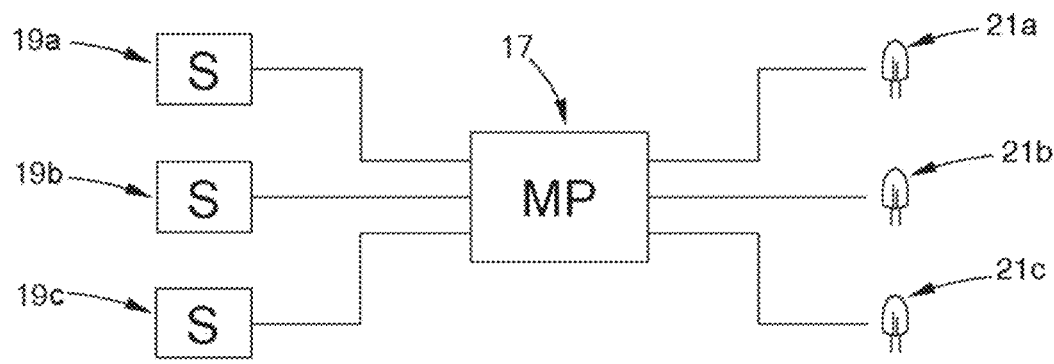
FIG. 9 shows an alternate view of FIG. 8 in a schematic form, showing the connections between the sensors, LED's, and the microprocessor

FIG. 9 is a schematic of the circuitry used in an embodiment of the present invention. In this case, sensors 901*a*, 901*b*, and 901*c* are associated with microprocessor 917. Microprocessor 17 is also associated with indicators 902*a*, 902*b*, and 903*c*.

Figure 10:
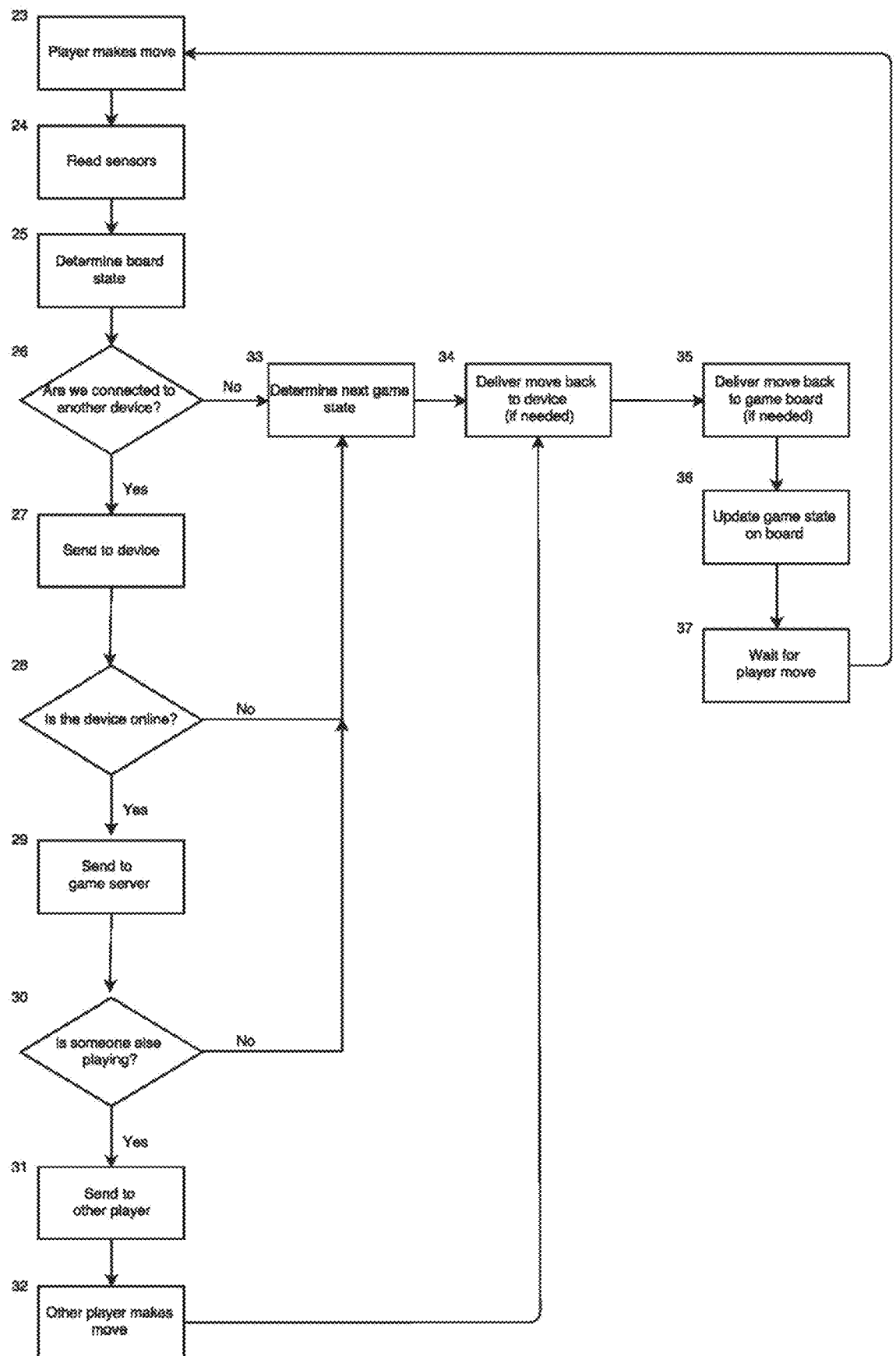
FIG. 10 is an in-depth flow chart showing how the game board can interpret a move that a player makes into the next state of play updated on the game board.

FIG. 10 is an in-depth flow chart showing the point from where a player makes a move, by moving a game piece, to the point that a feedback is given to the user. A processor inside the board continually monitors the sensors. When a player makes a move 23, the one or more sensors will report a change, allowing the board to determine when a move has been made. Next, all of the sensors are read 24, and the processor determines the current board state 25. From here, the game board determines if it is connected to another device, such as a mobile phone or computer, or even directly to the internet 26. If the user is in offline mode, the processor will determine the next game state 33, and then update the game state 36 for the user. In this example, the processor in the board computes the game state before showing the user. The user is notified of the game state 36, by using a method such as the one described in FIG. 8. If the game board is connected to another device such as a mobile phone, tablet, smartwatch or computer, the board can send the game state to the device 27. The device can also determine if the it should communicate to a server, through the internet, to determine the next game state 28 or make a decision locally through AI, for example, depending on the mode selected by the user or game board. If the next game state is determined locally 33, then that state is delivered back to the game board 35, which would then notify the user 36. Alternatively, if the device is connected to the internet, the game state can be sent to a server 29, which would then determine the next game state 33, deliver the game state back to the device 34, and then deliver the game state back to the board 35, and update the user 36. The game board would wait for the player to make a move 37, before starting the entire diagram over again at 23. A final example would be if a user was playing another person. After the game state was sent to the user 31, that game state would be delivered to the other player(s) device(s) 34, then to the other person's board 35, and the game state for the other player(s) would be updated 36. The other player(s) can then make a move using the same flow diagram as 23-31, while the first player waits for the move to be delivered back to his device 34, then game board 35 and the state to be updated 36.

ILLUSTRATIVE EXAMPLES

In some embodiments, the game board 2 has an antenna 18 which is in communication with either another game board 2 or a server. These embodiments allow a player to interact with another player using a physically separate game board. The server may store game states for both game boards and allow users to interact with other players around the world even when the two game boards are out of the communication ranges of their respective antennas, for example.

In yet other embodiments, each game board is associated with a memory that stores the moves of each player. A player may later access this data for later study of the game. This memory may store the moves for an entire game session, and is associated with microprocessor 17, which determines the moves of each player based on inputs from the game board's sensors 19.

In other embodiments, a user is able to play an AI player. In these instances, microprocessor 17 is in communication with a memory that stores an AI program for the game. The artificial intelligence will play against the user and the game board 2 will display the game state based on the AI player's moves. A user may be able to select the difficulty level of the AI player with increasing difficulties implementing a "harder" AI player. In other embodiments of the invention, the AI player is stored and run on game server 26 or a user's mobile phone (not shown). The present invention may be used with any board game, but preferably strategy games with two players using the same set of pieces. Preferably the present invention may be implemented with chess, checkers, or Go. Other embodiments will be readily apparent to those skilled in the art.

In yet another embodiment, the memory is able to store a plurality of lessons for instructing users in different game elements. These lessons may focus on studying different patterns of moves. Preferably these patterns include well-known strategies in chess and Go. A player will be able to play against an AI teacher that will work through all the iterations of game strategies with the user. For example, the memory may store a number of iterations of the strategy known as the Queen's Gambit in chess. The AI can react to a player's moves. In instances where players have picked a losing strategy, indicators 21 will notify the player. A similar concept would be for a Go player to practice Joseki, or Tesuji. Preferably, the indication that an improper move was made can include flashing indicators 21 with a red light.

In yet another embodiment, the game board comprises a memory unit. The memory may be any volatile or non-volatile memory, but is most preferably a solid state memory device. In embodiments where the board has memory two users could play a game on the same game board 2, allowing the game state to be monitored by microprocessor 17 and recorded into memory, and shared with the game server or a user's mobile phone or other device (not shown). An example for this would be a tournament game. The moves could be recorded and broadcasted in real time, to users all over the world. Since many users manually write down their moves at tournaments, use of the present device and methods would completely eliminate this tedious task and allow players to focus solely on the game.

The present invention may be used in any board game, but preferably strategy games with two players using the same set of pieces. Preferably the present invention may be implemented with chess, checkers, or Go. Other embodiments of the present invention will be readily apparent to those skilled in the art.

What is claimed is:

1. An electronic game comprising:
   a first game board having first game board locations;
   first game pieces for placement on the first game board locations;
   first photo sensors associated with the first game board locations and first light sources associated with the first photo sensors, wherein the first photo sensors and the first light sources are positioned opposite one another at the first game board locations;
   a first processor communicatively connected to the first photo sensors, wherein the first processor and the first photo sensors are configured to detect when any of the first game pieces are placed on the first game board locations by sensing a first reduction in light from the first light sources incident on the first photo sensors, wherein the first processor is configured to determine a first game board state;
   first indicators located at the first game board locations and communicatively connected to the first processor;
   a first wireless device configured to receive the first game board state and to wirelessly transmit the first game board state;
   a second game board, remote from the first game board, having second game board locations;
   second game pieces for placement on the second game board locations;
   second photo sensors associated with the second game board locations and second light sources associated with the second photo sensors, wherein the first photo sensors and the first light sources are positioned opposite one another at the first game board locations;
   a second processor communicatively connected to the second photo sensors, wherein the second processor and the second photo sensors are configured to detect when any of the second game pieces are placed on the second game board locations by sensing a second reduction in light from the second light sources incident on the second photo sensors, wherein the second processor is configured to determine a second game board state;
   second indicators located at the second game board locations and communicatively connected to the second processor;
   a second wireless device configured to receive the second game board state and to wirelessly transmit the second game board state;
   a game server configured to receive the first game board state from the first wireless device and to transmit the first game board state to the second wireless device;
   wherein the game server is configured to receive the second game board state from the second wireless device and to transmit the second game board state to the first wireless device;
   the first processor being configured to indicate the second game board state on the first game board via the first indicators and the second processor being configured to indicate the first game board state on the second game board via the second indicators; and
   the first processor and the second processor each being configured to indicate via the first indicators and the second indicators when any of the first game pieces or the second game pieces is placed in an incorrect location according to a set of game rules,
   wherein the electronic game is configured to process an updated state after communication is reestablished after an offline period.

2. The electronic game of claim 1, wherein the first photo sensors provide sensor data to the first processor; and wherein the first processor is operable to store the sensor data in a memory.

3. The electronic game of claim 2, wherein each of the first photo sensors include a photoresistor.

4. The electronic game of claim 3 wherein the processor is further configured to determine the first game board state based on comparing a photoresistor output with predetermined values in the memory, wherein the predetermined values are associated with the first game pieces.

5. An electronic board for Go, comprising:
   a wooden game board having a grid of intersecting lines, each intersection of the grid including a sensor and an indicator, wherein the indicator includes an indicator light,
   wherein the sensor comprises a photoresistor and a sensor light, wherein the photoresistor is located at a side of the intersection and the sensor light is located on the opposite side of the intersection;
   a power source configured to provide power to the electronic board;
   a processor, wherein the processor is configured to measure a resistance change of the photoresistor and to determine an intersection status for each intersection based on the resistance change, wherein the intersection status corresponds to whether a game piece is located at the intersection;
   a memory configured to receive and to store the intersection status for each intersection; and
   a wireless device configured to receive the intersection status and wirelessly transmit the intersection status to another wireless device.

6. The electronic board for Go of claim 5 wherein the wooden game board is a flat surface, and wherein the photoresistor and the sensor are each located below the flat surface.

7. The electronic board for Go of claim 5, wherein light from the sensor light is incident on the photoresistor when the power source is on and the intersection is empty, and wherein the photoresistor is configured to be occluded when the game piece is located at the intersection.

8. The electronic board for Go of claim 5, wherein the processor is configured to measure ambient light and to determine a current game state based on the ambient light and on the resistance change.

\* \* \* \* \*